United States Patent [19]

Yasuhara et al.

[11] Patent Number: 5,717,145
[45] Date of Patent: Feb. 10, 1998

[54] DETECTOR FOR AN ULTRASONIC FLOW METER

[75] Inventors: Takeshi Yasuhara; Tokio Sugi; Shigemi Kato, all of Tokyo, Japan

[73] Assignees: Tokyo Keiso Kabushiki-Kaisha; Kei Instrument Kabushiki-Kaisha, both of Tokyo, Japan

[21] Appl. No.: 615,763

[22] Filed: Mar. 14, 1996

[30] Foreign Application Priority Data

Apr. 10, 1995 [JP] Japan .................... 7-109008

[51] Int. Cl.$^6$ ................................................ G01F 1/00
[52] U.S. Cl. ............................ 73/861.29; 73/861.28
[58] Field of Search .......................... 73/861.27, 861.28, 73/861.29, 861.31, 861.18

[56] References Cited

U.S. PATENT DOCUMENTS 3,641,817   2/1972   Dory ............................. 73/861.29
5,179,862   1/1993   Lynnworth ..................... 73/861.28
5,458,004   10/1995  Van Der Pol .................. 73/861.29

*Primary Examiner*—Ronald L. Biegel
*Attorney, Agent, or Firm*—Lowe, Price, LeBlanc & Becker

[57] ABSTRACT

The flow meter is free from an external fluid flow noise. The detector has measuring pipe 1, inlet 2 and outlet 3 both axially lined up with base axis X. Pipe 1 is a straight one with opposite upstream and downstream closed ends, provided in each of which ends is echo sounder 4a, 4b capable of both transmitting and receiving the ultrasound. Inlet 2 is connected with a side of the upstream end via bent 2a. Outlet 3 is connected with another side of the downstream end via another bent 3a, which another side is radially opposite to the former side part in pipe 1 so that pipe 1 is tilted at a certain angle from base axis X which is axially lined up with axes of both inlet 2 and outlet 3; and, a center of base axis X coincides with a center of a flow path of a measured fluid inside pipe 1.

(See FIG. 1)

5 Claims, 3 Drawing Sheets

– – – – PROPAGATION COURSE OF ULTRASOUND
→ —→ FLOW OF FLUID

- - - - PROPAGATION COURSE OF ULTRASOUND
→—→ FLOW OF FLUID

DETECTOR FOR AN ULTRASONIC FLOW METER

BACKGROUND OF THE INVENTION

1. Field of the Invention

The present invention relates to a detector for an apparatus for determining fluid flow rate by means of ultrasonic waves and also relates to a flow meter provided with such detector.

2. Description of the Prior Art

When ultrasonic waves, i.e., ultrasound propagates in a flowing fluid, its propagation velocity is equal to the vector sum of Vo and U (where: Vo is a propagation velocity of the ultrasound in a measured fluid when a flow velocity of the fluid is zero; and U is the fluid flow velocity).

Consequently, it is possible to determine the fluid flow velocity on the basis of a difference between the propagation velocity of the ultrasound propagating downstream and that of the ultrasound propagating upstream.

Heretofore, a so-called propagation-velocity difference type of ultrasonic flow meter has been widely used in practice, in which type of ultrasonic flow meter there is provided in accordance with the above-mentioned principle, a device, which is a so-called "echo sounder" capable of both transmitting and receiving the ultrasound, disposed in each of a pair of positions A, B. In such a meter, a propagation time t1 taken for the ultrasound to propagate from the position A to the position B is measured together with a time t2 taken in propagation from the position B to the position A in the measured fluid, which propagation times t1, t2 of the ultrasound thus measured in its opposite propagation paths or courses make it possible to determine a difference in propagation velocity of the ultrasound in the above opposite courses, which makes it possible to determine flow rate of the measured fluid passing through a pipe and the like.

The above-mentioned conventional flow meters are classified into two types, i.e., an oblique measurement type and a parallel measurement type. In the former, as shown in FIG. 3, the propagation course of the ultrasound is tilted from a flow direction of the measured fluid, while in the latter the propagation course of the ultrasound is substantially parallel to the flow direction of the fluid, as shown in FIG. 4.

The oblique measurement type of the flow meter may use a straight measuring pipe, and, therefore be substantially free from pressure loss and characterized by its simplicity in construction. In this type of the flow meter, however, when the measuring pipe is small in diameter, the propagation course of the ultrasound therein is also shortened in length, which impairs a measuring accuracy of the ultrasound propagation time, and, therefore the accuracy in determination of the fluid flow rate is also impaired. Consequently, the oblique measurement type of the flow meter is hard to use in measuring flow rate of a small amount of the measured fluid.

On the other hand, although the parallel measurement type of flow meter may use a small-diameter measuring pipe which the oblique measurement type cannot use, the parallel measurement type suffers from the following problems, and, therefore finds its way only in an application field of small-diameter measuring pipes, in which field the oblique measurement type is hard to use.

The above-mentioned problems inherent in the parallel measurement type of the flow meter are as follows:

First, as is clear from FIG. 4, in the parallel measurement type of the flow meter, since a flow distance of the measured fluid flowing inside the measuring pipe (which forms a propagation course or path of the ultrasound) depends on its radial position in cross-section of the pipe, the flow velocity of the fluid inside the measuring pipe is faster in a lower side of the pipe than in an upper side of the same, so that flow rate of the fluid depends on its radial position in cross-section of the pipe.

Namely, the propagation time taken for the ultrasound to propagate in the fluid inside the measuring pipe depends on the radial position in a plane perpendicular to the fluid flow direction in the pipe. Consequently, as for wave forms of the ultrasound shown in FIG. 5, a received one is longer in duration than a transmitted one, and, therefore unclear in peak output.

As is clear from FIG. 6 illustrating examples of the distributions of flow velocities of the fluid in a bent measuring pipe with a bent angle of 90 degrees, the distributions (a, b, c) of flow velocities vary in axial position inside the measuring pipe and also depend on flow rate of the measured fluid. Consequently, it is difficult to precisely determine a mean propagation time of the ultrasound inside the measuring pipe on the basis on the above-mentioned received ultrasound assuming the longer-duration wave form, which makes it difficult to precisely determine flow rate of the fluid passing through the measuring pipe.

As for an industrial flow meter, in general, the flow meter is axially inserted in a pipeline and fixedly mounted therein through its mounting flanges which comprise an upstream one and a downstream one.

Consequently, it is preferable that a center axis of the upstream mounting flange is lined up with that of the downstream one. On the other hand, the parallel measurement type of flow meter has a construction such as shown in FIG. 7.

In this construction of flow meter, as is clear from FIG. 7, a center axis of a measuring pipe is radially offset from that of the pipeline to a large extent, which requires a considerably large space for mounting the measuring pipe in the pipeline together with its mounting flanges, and, therefore considerably restricts the pipeline in its design freedom.

In addition, since the entire length (i.e., a length between the upstream flange and the downstream flange) of the parallel measurement type of flow meter represents the sum of an axial length of the measuring pipe and that of each of the flanges with their neck portions, this type of flow meter is considerably bulky and heavy.

In this respect, the parallel measurement type of flow meter is decisively inferior to the other (i.e., the oblique measurement type of flow meter) in industrial use, and, therefore used only in an application field of small-diameter pipes where the oblique measurement type of flow meter is hard to use.

SUMMARY OF THE INVENTION

It is an object of the present invention to provide an ultrasonic flow meter, which solves the above problems inherent in the conventional parallel measurement type of flow meter and is decisively superior to the oblique measurement type of flow meter.

The above object of the present invention is accomplished by providing:

A detector for an ultrasonic flow meter, characterized in that:

(a) the detector is provided with a measuring pipe, an inlet pipe and an outlet pipe which are axially lined up with the same horizontal base axis, the measuring pipe being constructed of a straight pipe with opposite upstream and downstream closed end portions, said closed end portions are flat plates and perpendicular to the direction of flow of a measured fluid in said measuring pipe, provided in each of which closed end portions is an echo sounder capable of both transmitting and receiving the ultrasound;

(b) the inlet pipe is connected with a side part of the upstream closed end portion of the measuring pipe through a bent pipe portion, the outlet pipe is connected with another side part of the downstream closed end portion of the measuring pipe through another bent pipe portion, the another side part of the downstream closed end portion being radially opposite to the side part of the upstream closed end portion in the measuring pipe so that the measuring pipe is tilted at a certain angle from the horizontal base axis which is axially lined up with axes of both the inlet and the outlet pipe; and (c) a center of the horizontal base axis is coincident with that of a length of said flow path of a measured fluid inside the measuring pipe.

DESCRIPTION OF THE PREFERRED EMBODIMENTS

Figure 1:
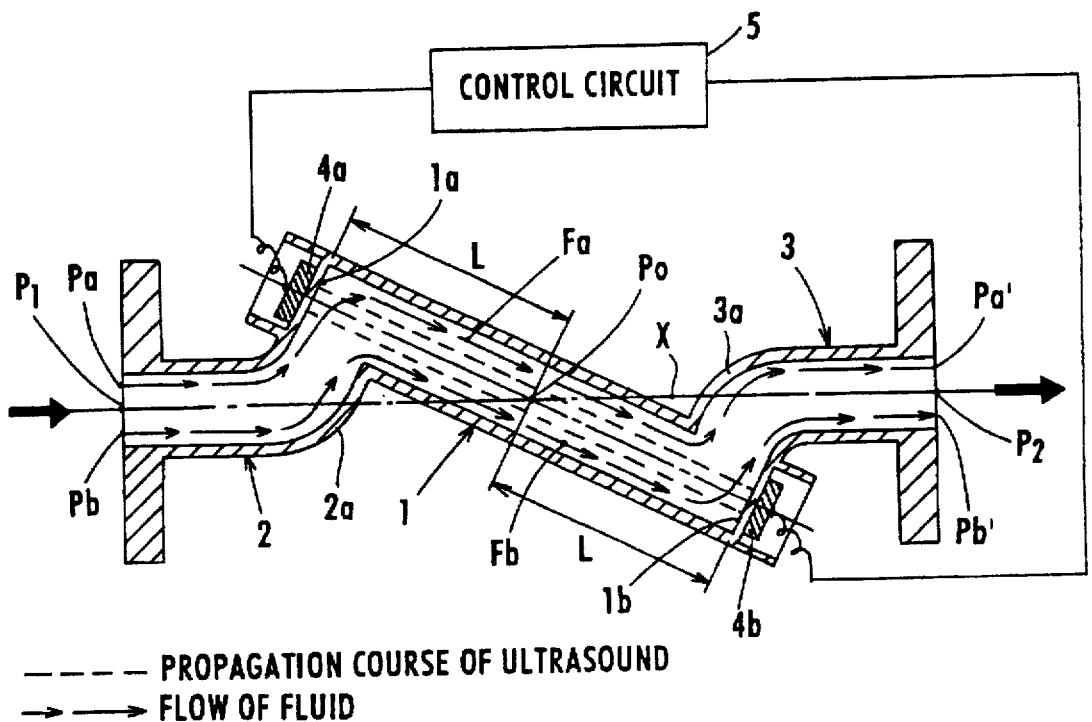
FIG. 1 is a longitudinal sectional view of the detector for the ultrasonic flow meter of the present invention.

Hereinbelow, the present invention will be described in detail with reference to the accompanying drawings, particularly to FIGS. 1 to 2.

A detector for an ultrasonic flow meter of the present invention is provided with a measuring pipe 1, an inlet pipe 2 and an outlet pipe 3. The measuring pipe 1 is constructed of a straight pipe with opposite upstream and downstream closed end portions 1a, 1b. As shown in FIG. 1, these closed end portions are flat plates and are perpendicular to the direction of flow of a measured fluid in the measuring pipe. Provided in each of the closed end portions is an echo sounder 4a, 4b which is capable of both transmitting and receiving the ultrasound.

The inlet pipe 2 and the outlet pipe 3 are axially lined up with the same horizontal base axis X.

Each of the echo sounders 4a, 4b is controlled by a control circuit 5 of the flow meter so as to be switched from its transmitting operation of the ultrasound to its receiving operation of the same. More specifically, when one of the echo sounder 4a, 4b transmits the ultrasound in a measured fluid, the other receives the thus transmitted one, so that a propagation time taken for the ultrasound to propagate from a position A to a position B in the measured fluid is determined together with a propagation time taken for the ultrasound to propagate from the position B to the position A with the use of a pair of the echo sounders 4a, 4b.

The control circuit 5 is provided with a change-over switch circuit for switching the echo sounder 4a, 4b from its transmitting operation to its receiving operation or vice versa and an arithmetic circuit for calculating flow rate of the measured fluid based on a difference in propagation time of the ultrasound propagating in the fluid. The thus calculated flow rate of the measured fluid is displayed on an indicator.

The measuring pipe 1, inlet pipe 2 and the outlet pipe 3 are connected with each other as follows (i) The measuring pipe 1 is tilted from the horizontal base axis X at an angle of from 20 to 50 degrees.

Namely, a side part (i.e., in a lower side of the measuring pipe 1 as viewed in FIG. 1) of the upstream closed end portion of the pipe 1 is connected with a bent pipe portion 2a of the inlet pipe 2. On the other and, the outlet pipe 3 is connected with another side part (i.e., in an upper side of the measuring pipe 1 as viewed in FIG. 1) of the downstream closed end portion of the pipe 1 through its bent pipe portion 3a.

Incidentally, although each of the bent pipe portions 2a, 3a shown in the drawings is a curved one, it may be an angled one.

(ii) The inlet pipe 2 and the outlet pipe 3 are point-symmetrical with respect to an axial center Po of the measuring pipe 1. In addition, an axial center line (i.e., horizontal base axis X, which passes through a center P1 of a mounting flange of the inlet pipe 2) passes through both the axial center Po of the measuring pipe 1 and a center P2 of a mounting flange of the outlet pipe 3.

In other words, the inlet pipe 2, measuring pipe 1 and the outlet pipe 3 have their longitudinal axes lie in the same (vertical or horizontal) plane. Both the inlet pipe 2 and the outlet pipe 3 have their longitudinal axes lined up with the same horizontal base axis X. In summary, the detector of the present invention for the ultrasonic flow meter is of a point-symmetrical type with respect to the axial center Po of the measuring pipe 1.

Because of the point symmetrical nature of the detector, it will be appreciated that the lengths of various flow paths in the detector are equal. For example, a length La of an upper side flow path (Fa) between points (Pa) and (Pa'), is equal to a length Lb of a lower side flow path (Fb) between points (Pb) and (Pb'). Thus, the travel distance of the measured fluid along any such flow path is independent of the position of the path in the cross-section of the detector (whether being the uppermost, lowermost, or intermediate flow path). That is, the travel distances along the various flow paths are equal.

Because of equality of travel distances, it will be understood that the flow velocities of the fluid in the various flow paths are also equal. That is, the mean value of flow velocity of the measured fluid in the flow detector of the present invention is substantially invariant with the position of the fluid in the cross-section of the detector.

Figure 2:
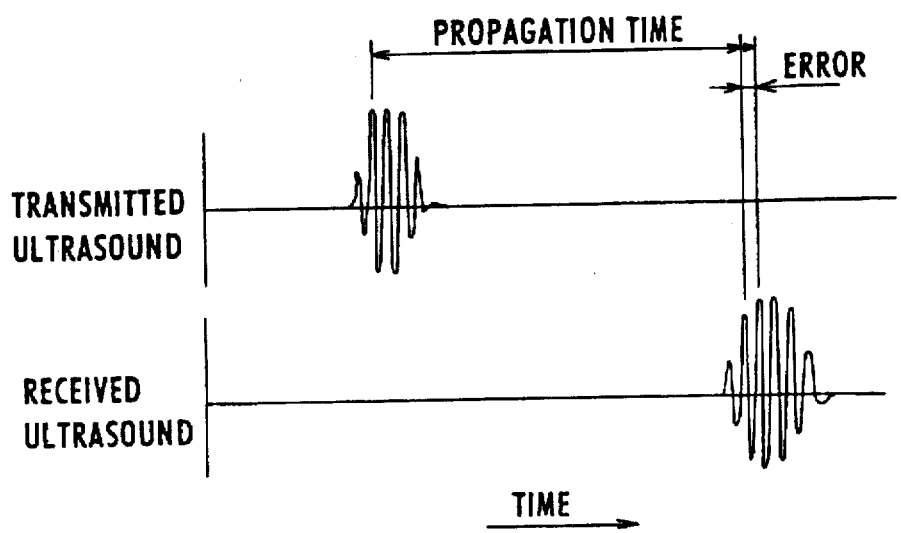
FIG. 2 is a schematic diagram of waveforms of the ultrasound, illustrating the relationship between the transmitted one and the received one of the ultrasound on a time base in the detector of the present invention.
Figure 3:
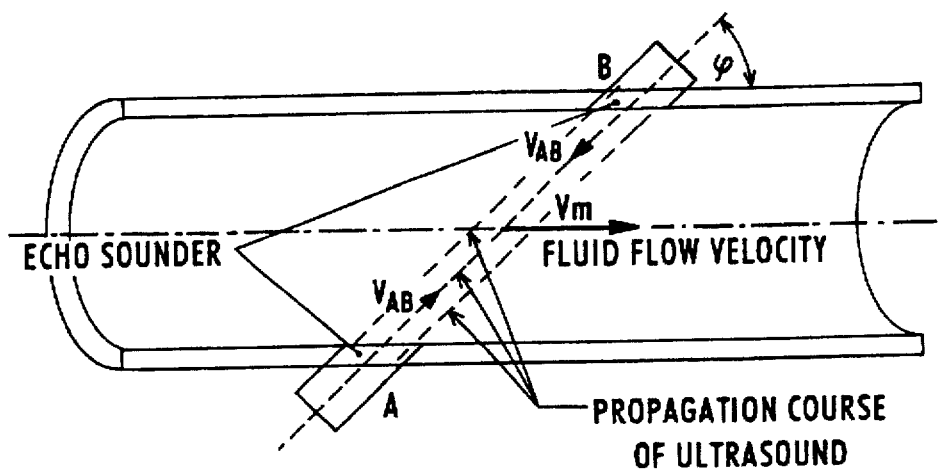
FIG. 3 is a longitudinal sectional view of the conventional oblique measurement type of flow meter.
Figure 4:
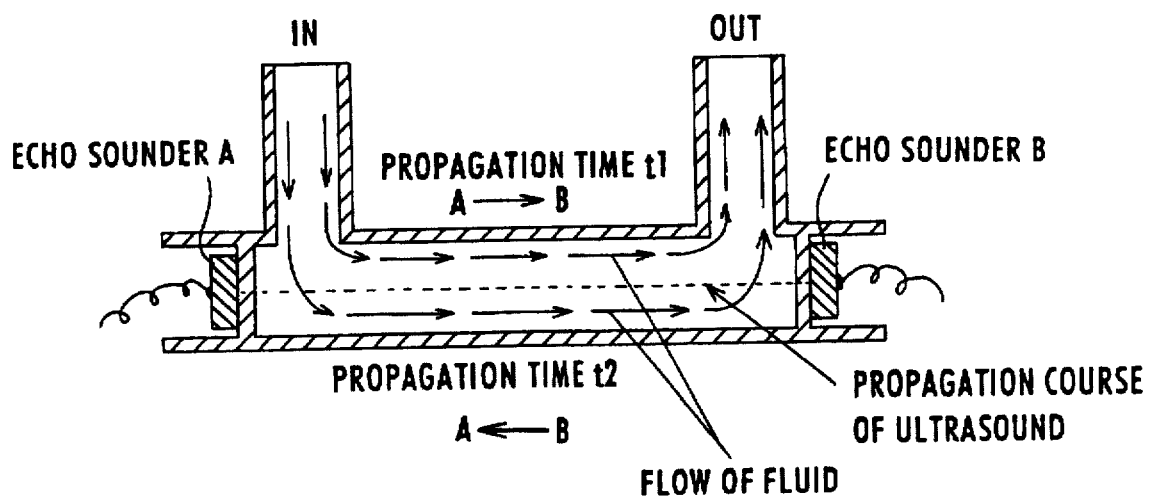
FIG. 4 is a longitudinal sectional view of the conventional parallel measurement type of flow meter.
Figure 5:
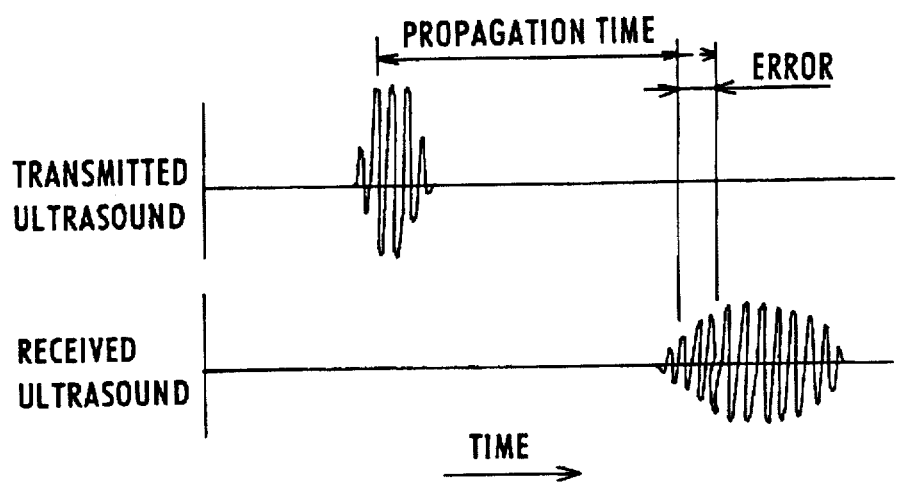
FIG. 5 is a schematic diagram of waveforms of the ultrasound, illustrating the relationship between the transmitted one and the received one of the ultrasound on a time base in the conventional parallel measurement type of flow meter.
Figure 6:
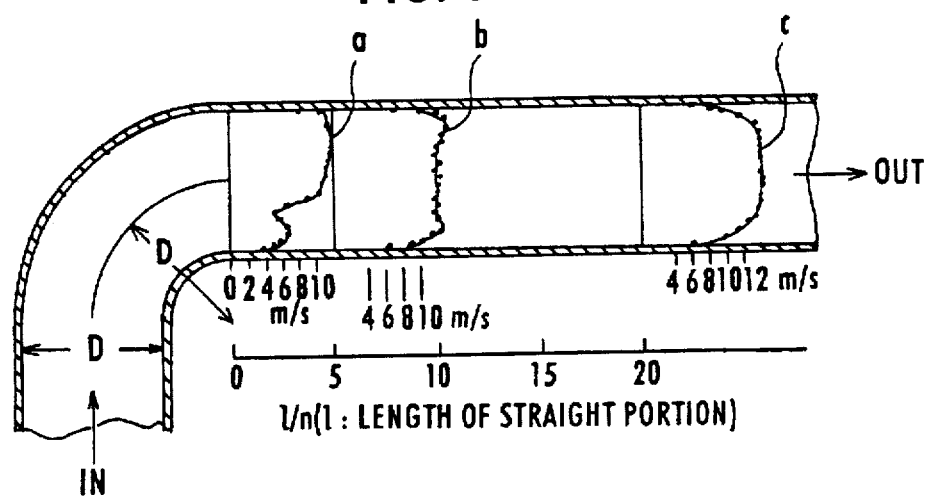
FIG. 6 is a longitudinal sectional view of the bent pipe portion of the measuring pipe, illustrating the distribution of flow velocities of the measured fluid therein.

Therefore, scattering of the flow velocity caused by difference of flow paths is minimized by the inventive structure and the peak of the output is clear and sharply defined, as shown in FIG. 2, thus providing significant improvement in the accuracy of flow measurement.

Consequently, it is possible for the detector of the present invention to determine the propagation time of the ultrasound with high accuracy in the measured fluid. Further, since deviation in flow velocity of the measured fluid in cross-section of the fluid flow path is neglected, an error occurring in calculation of flow rate based on the thus determined flow velocity of the measured fluid is also neglected, which realizes a precise one of the flow meter.

As described above, since the mounting flanges of the inlet pipe 2 and the outlet pipe 3 are arranged parallel in their faces to each other and have their axes aligned with each other, it is possible to insert or mount the detector or flow meter of the present invention in a conventional pipeline in series.

Figure 7:
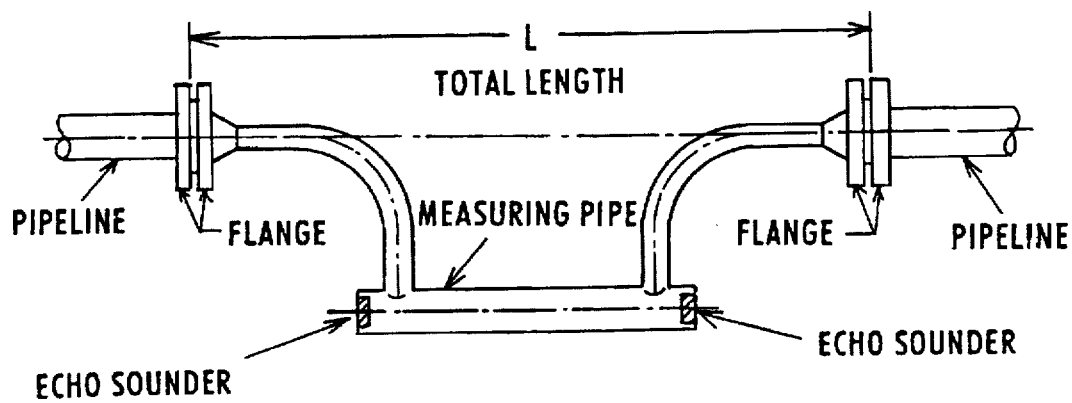
FIG. 7 is a partially sectional view of the conventional parallel measurement type of flow meter.

As is clear from a comparison between FIGS. 1 and 7, since the detector of the present invention is point-symmetrical with respect to the point Po shown in FIG. 1, it is smaller in width than the conventional one. In addition, the detector of the present invention is tilted from the horizontal base line X, which makes it possible to shorten the entire length of the detector of the present invention. The thus length-shortened detector of the present invention releases the pipeline from many restrictions on the freedom of construction.

In case of the detector of the present invention, the external size of the detector depends on the length and the inclination angle of measuring pipe 1. Consequently, when the detector is shortened in length, its external size also decreases.

As described above, in the detector of the present invention, the distribution of flow velocities of the measured fluid in the flow path or course is uniform, which enables the measuring pipe 1 to determine flow rate of the fluid with high accuracy even when the pipe 1 is of a short type. Consequently, the present invention may considerably downsize the flow meter using this type of detector in comparison with the conventional parallel measurement type of ultrasonic flow meter, provided that the two are the same in accuracy of measurement.

Since the present invention may remove the decisive drawbacks from the parallel measurement type of flow meter, the following advantages of the parallel measurement type of flow meter are remarkably recognized in comparison with the conventional oblique measurement type of flow meter, which enables the former (i.e., parallel measurement type) to be superior to the latter (i.e., oblique measurement type) even in the application field of small-diameter pipes where hitherto the latter is substantially exclusively used. The advantages of the parallel measurement type of flow meter thus remarkably recognized are as follows:

(1) This type of flow meter easily becomes superior to the other (i.e., oblique measurement type of flow meter) in accuracy of measurement by having its measuring pipe 1 increased in axial length (incidentally, in the oblique measurement type of flow meter, the ultrasound travels the same propagation distance in each size of pipe);

(2) Since this type of flow meter is provided with both the inlet pipe 2 and the outlet pipe 3, fluid flow of the measured fluid inside the measuring pipe 1 is substantially free from external fluid flow noises in external pipelines, which enables the parallel measurement type of flow meter to require no straight-pipe portion in opposite sides (i.e., in each of the upstream side and the downstream side) of the detector (in contrast with this, in case of the oblique measurement type of flow meter, it is not possible to determine flow rate of the fluid with high accuracy without using a sufficient-length straight pipe portion thereof); and (3) in order to realize high accuracy of measurement, the oblique measurement type of flow meter requires a pair, preferably more pairs of the echo sounders, whereas, the flow meter of the present requires only one pair of the echo sounders and is therefore superior to the former in the manufacturing cost.

As described above, the present invention removes the decisive two drawbacks from the conventional parallel measurement type of flow meter to realize a new type of flow meter which is superior to the oblique measurement type of flow meter in many points.

Incidentally, although the detector of the present invention is so illustrated as to have its measuring pipe 1 tilted in a vertical plane in the drawings (which realizes a vertical type of detector), it is also possible to have the measuring pipe 1 tilted in a horizontal plane so that a horizontal type of detector is realized.

What is claimed is:

1. A detector for an ultrasonic flow meter, characterized in that:

(a) said detector is provided with a measuring pipe, an inlet pipe and an outlet pipe which are axially lined up with the same horizontal base axis, said measuring pipe being constructed of a straight pipe with opposite upstream and downstream closed end portions, said closed end portions being flat plates and perpendicular to a direction of flow of a measured fluid in said measuring pipe, provided in each of which closed end portions is an echo sounder capable of both transmitting and receiving the ultrasound;

(b) said inlet pipe is connected with a side part of said upstream closed end portion of said measuring pipe through a bent pipe portion, and said outlet pipe is connected with another side part of said downstream closed end portion of said measuring pipe through another bent pipe portion, said another side part of said downstream closed end portion being radially opposite to said side part of said upstream closed end portion in said measuring pipe so that said measuring pipe is tilted at a certain angle from said horizontal base axis which is axially lined up with axes of both said inlet and said outlet pipe; and (c) a center of said horizontal base axis is coincident with an axial center ($P_0$) of a length of a flow path of said measured fluid inside said measuring pipe, and said detector has a point symmetry with respect to said axial center ($P_0$) of said measuring pipe.

2. The detector for the ultrasonic flow meter, as set forth in claim 1, wherein:

said measuring pipe is tilted from said horizontal base axis in a vertical plane.

3. The detector for the ultrasonic flow meter, as set forth in claim 1, wherein:

said measuring pipe is tilted from said horizontal base axis in a horizontal plane.

4. A detector for an ultrasonic flow meter, characterized in that:

(a) said detector is provided with a measuring pipe, an inlet pipe and an outlet pipe which are axially lined up with the same horizontal base axis, said measuring pipe being constructed of a straight pipe with opposite upstream and downstream closed end portions, said closed end portions being flat plates and perpendicular to a direction of flow of a measured fluid in said measuring pipe, provided in each of which closed end portions is an echo sounder capable of both transmitting and receiving the ultrasound;

(b) said inlet pipe is connected with a side part of said upstream closed end portion of said measuring pipe through a bent pipe portion, and said outlet pipe is connected with another side part of said downstream closed end portion of said measuring pipe through another bent pipe portion, said another side part of said downstream closed end portion being radially opposite to said side part of said upstream closed end portion in said measuring pipe so that said measuring pipe is tilted at a certain angle from said horizontal base axis which is axially lined up with axes of both said inlet and said outlet pipe; and (c) a center of said horizontal base axis is coincident with a center of a length of a flow path of said measured fluid inside said measuring pipe, wherein:

said measuring pipe is tilted from said horizontal base axis at an angle of from 20 to 50 degrees.

5. A detector for an ultrasonic flow meter, characterized in that:

(a) said detector is provided with a measuring pipe, an inlet pipe and an outlet pipe which are axially lined up with the same horizontal base axis, said measuring pipe being constructed of a straight pipe with opposite upstream and downstream closed end portions, said closed end portions being flat plates and perpendicular to a direction of flow of a measured fluid in said measuring pipe, provided in each of which closed end portions is an echo sounder capable of both transmitting and receiving the ultrasound;

(b) said inlet pipe is connected with a side part of said upstream closed end portion of said measuring pipe through a bent pipe portion, and said outlet pipe is connected with another side part of said downstream closed end portion of said measuring pipe through another bent pipe portion, said another side part of said downstream closed end portion being radially opposite to said side part of said upstream closed end portion in said measuring pipe so that said measuring pipe is tilted at a certain angle from said horizontal base axis which is axially lined up with axes of both said inlet and said outlet pipe; and (c) a center of said horizontal base axis is coincident with a center of a length of a flow path of said measured fluid inside said measuring pipe, wherein each said echo sounder at each of said closed end portions is positioned by each said flat plate to transmit the ultrasound in the direction of flow of said measured fluid in said measuring pipe.

* * * * *

UNITED STATES PATENT AND TRADEMARK OFFICE
CERTIFICATE OF CORRECTION

PATENT NO. : 5,717,145
DATED : February 10, 1998
INVENTOR(S) : Takeshi Yasuhara et al.

It is certified that error appears in the above-indentified patent and that said Letters Patent is hereby corrected as shown below: On the title page:

Item [54]
After 'METER' insert --AND A FLOW METER WITH THE DETECTOR--

Signed and Sealed this

Fifteenth Day of May, 2001

Attest:

NICHOLAS P. GODICI

Attesting Officer          Acting Director of the United States Patent and Trademark Office